E. L. TARBOX.
Improvement in Stencil Plates.
No. 4,402. Reissued May 30, 1871.
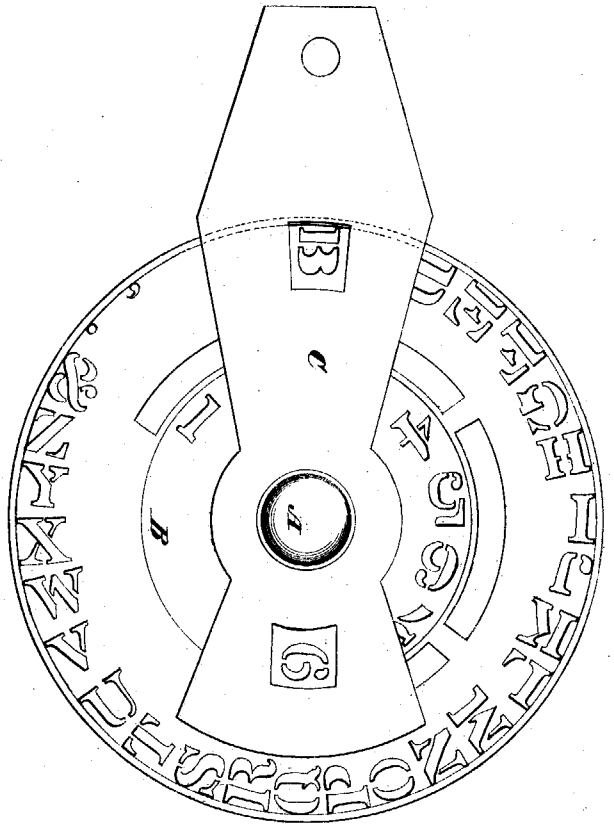
Witnesses:
Gustave Dieterich
Wm. H. C. Smith.
Inventor:
E. L. Tarbox.
Per
Attorneys.
AM. PHOTO-LITHOGRAPHIC CO. N.Y. (OSBORNE'S PROCESS.)

UNITED STATES PATENT OFFICE.

EUGENE L. TARBOX, OF NEW YORK, N. Y.

IMPROVEMENT IN STENCIL-PLATES.

Specification forming part of Letters Patent No. 81,032, dated August 11, 1868; reissue No. 4,402, dated May 30, 1871.

*To all whom it may concern:*

Be it known that I, EUGENE L. TARBOX, of the city, county, and State of New York, have invented a new and useful Improvement in Stencil-Plates; and I do hereby declare that the following is a full, clear, and exact description thereof, which will enable others skilled in the art to make and use the same, reference being had to the accompanying drawing forming part of this specification.

This invention relates to plates through which letters or figures are cut for marking boxes, bales, and other articles, called stencil-plates; and it consists in the arrangement of the letters of the alphabet and the figures in circles in the plate, so that the letters and figures (but especially the letters) shall face the pivoted center of the plate, and not be placed with their vertical lines radially therewith, the letters and figures so arranged being used in combination with a revolving shield, whereby the letters or figures may be transferred singly or one at a time.

The drawing represents the plate with the letters arranged according to my invention, showing also the revolving shield.

A is the knob or handle on the center of the plate. B is the plate. C represents the shield, which revolves on the center of the plate or shank-screw of the handle. The plate B is a circular disk of metal with the letters of the alphabet cut through it, and also with a circle of figures. The shield has orifices through it which correspond in position with the circles of letters and figures on the plate. This shield is broad enough to cover a portion of the plate and protect the latter from the stencil-brush while the letter or figure which it is desired to use is exposed through the orifices, as seen.

In the position seen in the drawing the shield allows the letter B and the figure 6 to be used without interfering with any other letters or figures, and so on with all the letters and figures on the plate.

By arranging the letters facing the center of the plate they can be used with more facility and with much greater accuracy than they can when placed parallel with radial lines. With this arrangement the margin of the plate outside the letters is used to space the letters or to govern the distance from each other.

Where the letters are arranged parallel with radial lines instead of facing the center of the plate the letter-orifice through the shield must, as in the present instance, be sufficiently broad to show any letter of the alphabet—the letter W as well as the I; but in showing the latter a portion of either one or both of the adjacent letters will be exposed, thus rendering the marking imperfect and indistinct. My arrangement of the letters obviates this difficulty.

There are other advantages incident to my mode of arrangement, which will be apparent in using the plate. The orifices through the plate B adjoining the figures serve as windows to see how to place the figures in marking. The shield serves as a blind, closing the orifices as the figures are being used; otherwise each preceding figure would be blotted as the figures following were being used. The space between the orifices and figures is used for spacing the figures or regulating their distance from each other, the same as the marginal space of the plate is used for spacing the latter.

Having thus described my invention, I claim as new and desire to secure by Letters Patent—

1. The plate B, shield C, and handle A, when the letters of the alphabet and the figures (or either the letters or the figures) are arranged in the plate facing the center of the plate, substantially as shown and described, and for the purposes set forth.

2. Using the margin of the plate and the distance between the openings and the figures as a spacing distance between the letters and figures, substantially as shown and described.

3. The shield C, constructed substantially as and for the purposes described.

EUGENE L. TARBOX.

Witnesses:

T. B. MOSHER,

GEO. W. MABEE.